United States Patent [19]

Tsai

[11] Patent Number: 5,132,285
[45] Date of Patent: Jul. 21, 1992

[54] METHOD FOR THICKENING OR STABILIZING AQUEOUS MEDIA WITH POLYAMPHOTERIC POLYSACCHARIDES

[75] Inventor: John J. Tsai, Belle Mead, N.J.

[73] Assignee: National Starch and Chemical Investment Holding Corporation, Wilmington, Del.

[21] Appl. No.: 455,854

[22] Filed: Dec. 19, 1989

Related U.S. Application Data

[63] Continuation of Ser. No. 184,278, Apr. 26, 1988, abandoned.

[51] Int. Cl.$^5$ .................. D21H 17/45; D21H 17/24; C09K 7/02
[52] U.S. Cl. .................................... 507/121; 507/122; 252/312; 252/315.3; 252/315.4; 162/168.3; 162/168.5; 527/312
[58] Field of Search ............ 162/168.5, 168.3; 252/315.3, 315.4; 527/312; 507/121, 122

[56] References Cited

U.S. PATENT DOCUMENTS

| | | | |
|---|---|---|---|
| Re. 28,576 | 10/1975 | Anderson et al. | 260/29.6 H |
| 4,222,881 | 9/1980 | Byham et al. | 252/8.55 D |
| 4,464,523 | 8/1984 | Neigel et al. | 527/312 X |
| 4,540,510 | 9/1985 | Karl | 523/130 X |
| 4,563,497 | 1/1986 | Masanek et al. | 524/732 |
| 4,637,882 | 1/1987 | Peiffer et al. | 252/8.514 |
| 4,652,623 | 3/1987 | Chen et al. | 526/287 |
| 4,663,163 | 5/1987 | Hou et al. | 527/312 X |
| 4,673,716 | 6/1987 | Siano et al. | 525/367 |
| 4,676,317 | 6/1987 | Fry et al. | 523/130 X |
| 4,690,996 | 9/1987 | Shih et al. | 527/312 |
| 4,710,555 | 12/1987 | Peiffer et al. | 526/240 |

FOREIGN PATENT DOCUMENTS 601461  7/1960  Canada ................ 162/168.3

OTHER PUBLICATIONS

Salamone, J. C., et al., "Aqueous Salt Absorption by Ampholytic Polysaccharides," *Polymer*, 26:1234 (1985). (Earlier publication: Technical Rep. to Office of Naval Research Chemistry under Contract No. N00014-83-K-8674 Feb. 27, 1985).

Lin, Kao-Ching, *Hydrophilic, Ampholytic Graft Copolymers*, M.S. Thesis, University of Lowell, Sep. 1983, pp. 8 (line 5); 29-30; 34-41; 47-51; 71-73.

Salamone, J. C., et al., "Synthesis and Aqueous Solution Viscosity Behavior of Polyampholytes from Cationic-Anionic Monomer Pairs," *ACS Sym. Ser.*, 187:337 (1980).

Salamone, J. C., et al. "Preparation of Inner Salt Polymers from Vinylimidazolium Sulfobetaines," *Polymer*, 18:1058 (1977).

Salamone, J. C., et al., "Aqueous Solution Properties of a Poly (vinyl imidazolium sulphobetaine)", *Polymer* 19:1157 (1978).

*Primary Examiner*—John S. Maples
*Assistant Examiner*—Gary L. Geist
*Attorney, Agent, or Firm*—Mary E. Porter; Edwin M. Szala

[57] ABSTRACT

A method of thickening, stabilizing, controlling mobility, or enhancing water retention in aqueous media and electrolyte-containing aqueous media employs neutrally-charged polyamphoteric graft copolymers of polysaccharides with zwitterionic monomers or cationic/anionic monomer pairs. These polyampholytes are characterized by their unique resistance to loss of intrinsic viscosity in the presence of electrolytes. These polyampholytes may be prepared by an inverse emulsion method of graft copolymerization. One such electrolyte-tolerant polyampholyte is a novel composition prepared by graft copolymerization of guar gum.

7 Claims, No Drawings

METHOD FOR THICKENING OR STABILIZING AQUEOUS MEDIA WITH POLYAMPHOTERIC POLYSACCHARIDES

This application is a continuation of application Ser. No. 07/184,278, filed Apr. 26, 1988, now abandoned.

BACKGROUND OF THE INVENTION

This invention relates to a method for thickening or stabilizing aqueous media and electrolyte-containing aqueous media comprising the addition to the media of neutrally-charged polyampholytes which are graft copolymers of polysaccharides with a zwitterionic monomer or cationic/anionic monomer pairs. These polyampholytes are characterized by water dispersibility and resistance to loss of intrinsic viscosity in the presence of electrolytes in aqueous media. This invention also relates to an inverse emulsion (water-in-oil) method for preparing these polyampholytes and to a novel polyampholyte composition prepared from guar gum that is useful as a thickener and stabilizer in electrolyte-containing aqueous media.

It is well known that the rheology of aqueous media may be modified and controlled by the addition of high molecular weight, water soluble polymers, such as polyacrylamide, polystyrene sulfonate, polysaccharides, carboxymethylcellulose, xanthan gum and guar gum, and their derivatives. It is also well known that the introduction of ionic substituent groups onto polysaccharides (e.g., starches) or other polymers improves the retention of water and the polysaccharide or polymer in applications such as papermaking and oil well drilling. The nature of the ionic substituent has a substantial effect on the rheology of the polyionic polymer. A typical polyelectrolyte is highly water soluble or dispersible. The viscosity of a typical polyelectrolyte (polyanion or polycation) decreases rapidly in the presence of electrolytes. The typical polyampholyte (containing anionic and cationic moieties) is soluble or dispersible in electrolyte containing solutions and insoluble or not dispersible in water and often increases in viscosity in the presence of electrolytes.

The improvements in rheology control obtained by introducing ionic substituents onto a polymer are lost or substantially diminished when a polyionic polymer is used in an electrolyte-containing medium, such as the high conductivity ("thick stock") medium which may be encountered in papermaking.

Similar problems have been observed in the presence of electrolytes when polyionic derivatives of water soluble polymers are used in oil drilling operations, water flood recovery of subterranean oil and other industrial applications. The enhanced thickening ability of synthetic polyionic polymers, such as ionic copolymers of polyacrylamide and polystyrene sulfonate, is greatly reduced by the presence of electrolytes such as calcium or sodium chloride, and magnesium sulfate in subterranean oil formations. These electrolytes are normally present in ground water and in drilling mud fluids. Therefore, the utility of these polymers in oil recovery is also greatly reduced.

Polymers known to be resistant to this electrolyte effect, such as xanthan gum, lack thermal or shear stability, or are easily biodegraded, too costly, or otherwise unacceptable for oil recovery operations.

Several patents address this oil recovery problem. For example, U.S. Pat. No. 4,222,881 to Byham, et al. discloses an amphoteric polyelectrolyte thickener which is a block copolymer of quaternary vinyl pyridinium sulfonate and alpha-olefin or hydrogenated diene (i.e., vinyl pyridinium sulfonate-styrene block copolymer), containing equimolar charge ratios. U.S. Pat. No. 4,673,716 to Siano, et al. discloses high molecular weight terpolymers of acrylamide, oil soluble higher alkylacrylamide and alkali metal acrylate which are capable of thickening water or brine.

Polymers useful in oil recovery, and in other acid, base or salt containing aqueous media, are disclosed in U.S. Pat. No. 4,710,555 to Peiffer, et al. Synthesized from acrylamide, sodium styrene sulfonate and methacrylamidopropyltrimethylammonium chloride, these polymers are claimed to have viscosity-polymer concentration relationships that are invarient with the presence of acid, base or salt and to possess a balance between conventional polyelectrolyte and polyampholyte behavior. Anionic and cationic moieties are not necessarily present in amounts that result in an equimolar charge ratio.

For oil drilling fluid applications, U.S. Pat. No. 4,600,515 to Gleason, et al. discloses high molecular weight, water-in-oil emulsion copolymers of acrylamide and a water soluble salt of acrylic acid which display improved divalent cation tolerance. U.S. Pat. No. 4,652,623 to Chen, et al. discloses an oil drilling polyampholyte synthesized from an unsaturated carboxylic acid, an unsaturated sulfonic acid, an unsaturated cationic-containing compound and a non-ionic monomer. U.S. Pat. No. 4,637,882 to Peiffer, et al. discloses drilling muds prepared from terpolymers based on N-vinyl 2-pyrrolidone/sodium styrene sulfonate/methacrylamidopropyltrimethylammonium chloride.

None of these references teach the use of polyamphoteric graft copolymers prepared from high molecular weight polysaccharides, such as starch, cellulose or guar gum, as electrolyte-tolerant thickeners or stabilizers. The polysaccharide graft copolymers of this invention are effective rheology control agents in the presence of electrolytes. Unlike conventional polyampholytes, they are soluble or dispersible in water. Such graft copolymers also offer the advantage over those disclosed in the references of economy, ease of preparation and ease of handling in the form disclosed herein.

The preparation of an electrolyte-tolerant polyampholyte from starch or hydroxyethyl cellulose by graft copolymerization with a water soluble cationic/anionic monomer pair and a neutrally-charged water soluble monomer has been reported. Salamone, J. C., et al., "Aqueous Salt Absorption by Ampholytic Polysaccharides," *Polymer*, 26: 1234-1238 (1985). These polysaccharide polyampholytes exhibited increasing viscosity with the addition of increasing amounts of sodium chloride in solution. They also exhibited increasing water absorbancy, particularly in the presence of electrolytes, when the percent incorporation of the ionic monomers onto the polyampholyte was increased.

It was noted by Salamone, et al., that use of cobalt-60 radiation to initiate graft copolymerization leads to tough, rubber-like copolymers, presumably caused by excessive cross-linking. Copolymers prepared by cobalt-60 initiation were not water soluble. Successful results were only reported using cerium (IV) initiation. (See also, Kao-Ching Lin, *Hydrophilic, Ampholytic Graft Copolymers*, M. S. Thesis, University of Lowell, September, 1983.) However, cerium (IV) initiation has the disadvantage that highly toxic material must be handled. Thus, there is a need for a method of graft polymerization of polysaccharides which may be carried out using another type of initiation.

Other disadvantages of known methods for preparing polysaccharide polyions, such as difficulty concentrating the product, isolating the polyampholyte from the reaction medium for various applications, or handling unstable reagents, have been addressed in the literature. For example, U.S. Pat. No. 4,017,460 to Tessler discloses a method for preparing amphoteric starch derivatives where the zwitterionic reagent is synthesized in situ from a secondary amine and an acid or ester of an acid. This method ameliorates problems associated with preparation and handling of unstable reagents. However, this reference concerns starch derivatives and does not address the problems associated with known methods for graft copolymerization of the polyampholytes of this invention.

Thus, it is an object of this invention to provide economical, commercially feasible solutions to the need for high molecular weight polyampholytes for thickening and stabilizing electrolyte-containing aqueous media.

SUMMARY OF THE INVENTION

This invention provides a method for thickening or stabilizing aqueous media and electrolyte-containing aqueous media comprising the use of the neutrally-charged, polyamphoteric graft copolymers which are disclosed herein. This method finds use in papermaking, oil drilling, oil recovery and other processes where high molecular weight polyionic compounds are used to thicken, retain water or stabilize electrolyte-containing aqueous media.

This invention also provides a method of preparing polysaccharide derived polyampholytes, which method is a modification of the inverse emulsion method taught in U.S. Pat. No. 4,690,996 to Shih, et al. The inverse emulsion method for providing water soluble graft copolymers comprises (a) providing an emulsion of an aqueous discontinuous phase containing the polysaccharide and certain ionic monomers and, optionally, comonomers, and a hydrophobic continuous phase containing an inert solvent and an oil soluble surfactant; and (b) polymerizing the reactants by heating under free radical conditions in the presence of a thermal initiator. Suitable ionic monomers include zwitterionic monomer, cationic/anionic monomer pairs or any polymerizable water soluble ionic monomer or monomers capable of yielding the equimolar ratio of anionic to cationic moieties which is essential to the electrolyte tolerant properties useful herein.

Additionally, this invention provides a novel, neutrally-charged, water dispersible polyampholyte obtained by graft copolymerization of guar gum with certain ionic monomers which is characterized by resistance to loss of intrinsic viscosity in the presence of electrolytes.

DESCRIPTION OF THE PREFERRED EMBODIMENTS

The method of this invention for thickening and stabilizing aqueous media and electrolyte-containing aqueous media comprises the addition to the media of polyampholytes which are graft copolymers of a polysaccharide with a zwitterionic monomer or a cationic/anionic monomer pair. The amount of polyampholyte used may be readily adjusted by the practitioner to suit a particular application. In a preferred embodiment for an oil drilling mud application, 2-3 pounds per barrel (ppb) of the polyampholyte are used to thicken the drilling mud.

The polyampholyte of this method may be prepared by any method known in the art for graft copolymerization of polysaccharides. For example, free radical initiation with chemicals, high energy radiation or heat may be employed in solution, suspension, emulsion or other medium useful for graft copolymerization. In a preferred and novel embodiment, the polyampholyte is prepared in an emulsion by free radical synthesis with thermal initiation. Together with the zwitterion or cationic/anionic monomer pair, a neutrally-charged reactive comonomer is graft copolymerized onto the polysaccharide to improve the reaction efficiency. The polyampholyte thickening and stabilizing agents herein must possess a substantially equal number of positive and negative charges following copolymerization.

Polysaccharides are defined herein to include polysaccharide-containing polymers obtained from plant, animal and microbial sources, including those which are presently known and those which may become known in the future. Examples of polysaccharides are starch, cellulose, gums and derivatives of each.

Starches, including those derived from corn, potato, wheat, rice, sago, tapioca, waxy maize, or sorghum and amylose, as well as the conversion products and derivatives thereof, are the preferred substrates due to their cost and availability. For certain end uses, derivatized starches, such as esters and ethers, have been found effective. In particular, starches derivatized with allyl glycidyl ether have shown optimum properties in the graft copolymerization method disclosed herein.

The polysaccharide may be used in any form so long as that form renders the polymer molecules available for graft copolymerization. For example, in a preferred embodiment an acid-converted starch derivative is gelatinized by cooking in water to yield an aqueous starch dispersion. In such a dispersion, the starch molecules are more readily accessible for graft copolymerization than are the starch molecules of an aqueous starch granule slurry.

The amount of polysaccharide may vary from 5 to 95%, preferably from 20 to 50% by weight of the final graft copolymer.

Suitable monomers for preparing the thickening and stabilizing agents herein include any water-soluble, unsaturated compounds that are capable of free radical polymerization, which are selected to yield an equal number of positive and negative charges on the graft copolymer, as evidenced by its neutral charge.

Water soluble is defined herein to mean monomers which have a minimum solubility of 5% by weight in water at 25° C. Such monomers include acrylic and methacrylic acid; acrylamide, methacrylamide, acrylonitrile; N,N-dialkylaminoalkyl acrylates and methacrylates (wherein the alkyl group contains 1 to 4 carbon atoms); ethylenically unsaturated quaternary ammonium salts such as N,N,N-trimethylaminoethyl methacrylate methylsulfate or halide, 2-hydroxy-3-methacryloxypropyltrimethyl-ammonium methyl sulfate or halide, vinylbenzyltrialkylammonium methylsulfate or halide; sodium or ammonium styrenesulfonate; vinyl pyrrolidone; hydroxyl alkyl acrylates and methacrylates; sodium 2-acrylamide-2-methylpropane sulfonate, etc. Various other water-soluble monomers suitable for graft polymerization with polysaccharides are known to those skilled in the art.

In a preferred embodiment, a zwitterionic monomer, such as 1-vinyl-3-(3-sulfopropyl)imidazolium inner salt, or 4-vinyl-(1-sulfopropyl) pyridinium inner salt is used. The formula of 1-vinyl-3(3-sulfopropyl) imidazolium inner salt, which is also known as 1-vinyl-imidazolium sulfobetaine (VISB), is:

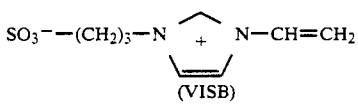

(VISB)

If a cationic/anionic monomer pair is used, the cationic monomer may be selected from a group including: methacrylamidopropyltrimethylammonium chloride, dimethyldiallylammonium chloride, diethyldiallylammonium chloride, 2-methacryloxyethyltrimethylammonium chloride, trimethylmethacryloxyethylammonium methosulfate, 2-acrylamide-2-methylpropyltrimethylammonium chloride, vinylbenzyltrimethylammonium chloride, and the like.

The anionic monomer may be selected from a group including: 2-acrylamido-2-methylpropanesulfonic acid, sodium styrenesulfonate, (meth)acrylic acid, methacryloxyethylsulfonic acid, and the like.

Suitable cationic/anionic monomer pairs include 4-vinylpyridinium ion/vinyl sulfonate ion, characterized by the structures:

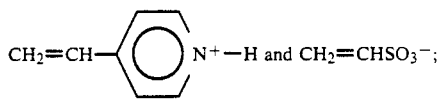

and 3-methacrylamidopropyldimethylammonium ion/2-acrylamido-2-methylpropanesulfonate ion, characterized by the structures:

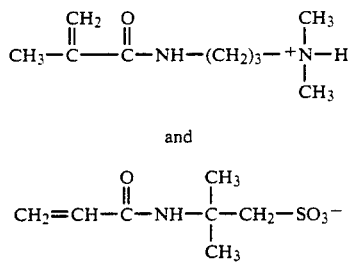

In a preferred embodiment, the cationic/anionic monomer pair consists of 3-methacrylamidopropyltrimethylammonium ion/2-acrylamido-2-methylpropanesulfonate ion (TMAPMA-AAPS). The formula of the TMAPMA-AAPS pair is:

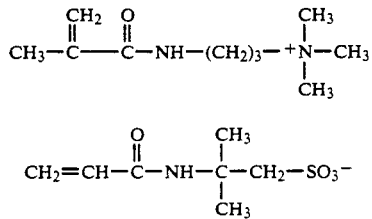

If a reactive nonionic comonomer is to be used, suitable comonomers include any nonionic water-soluble monomer, such as: (N,N-dimethyl) acrylamide, hydroxyethyl (meth)acrylate, alkyl substituted acrylamides, (meth)acrylates, N-vinyllactones (e.g., N-vinyl-2-pyrolidone), and the like. In a preferred embodiment, acrylamide is used as the nonionic reactive monomer.

The monomer listed herein may be used in any form desired for a particular application. Thus, where a monomer is listed herein in its acid form, the salt form is meant to be included, and vice versa.

The amount of ionic monomer may vary from 95 to 5%, preferably from 80 to 50%, by weight of the final graft copolymer. The amount of the reactive nonionic comonomer may vary from 0-50% by weight of the total monomer in the final graft copolymer. Amounts used depend upon the particular monomers selected and intended end-use of the graft copolymer.

In a preferred embodiment, VISB and acrylamide are grafted onto an allyl glycidyl ether derivative of a waxy maize starch that has been acid-converted to 85 water fluidity (WF) and gelatinized prior to polymerization with VISB. In a second preferred embodiment, a cationic/anionic monomer pair, TMAPMA-AAPS, and acrylamide are grafted onto the same starch derivative following conversion and gelatinization. The composition, by weight, of the final graft copolymer is approximately 55 to 60% starch and 45 to 40% monomer, of which the ionic to nonionic monomer ratio, by weight, is 2 to 1.

These polyampholytes which are prepared from polysaccharides that have been graft copolymerized with suitable ionic and non-ionic monomers may be used as a low cost alternative in any industrial application wherein synthetic polyampholyte stabilizers, thickeners or water loss control agents, such as those discussed in the Background of the Invention, supra, are advantageously employed. For example, the polysaccharide-derived thickeners and stabilizers of this invention may find use in paper making, oil drilling or oil flood recovery.

The preferred method of graft copolymerization of these polysaccharides is by the inverse emulsion method disclosed herein. The inverse emulsion method of this invention comprises two steps wherein a water dispersible polyampholyte that is characterized by resistance to loss of viscosity in the presence of electrolytes is prepared from a polysaccharide, a zwitterionic monomer or monomer pair, and, optionally, a neutral reactive monomer. In the first step, the method provides for emulsification of the polysaccharide and a zwitterionic monomer or a cationic/anionic monomer pair, and, optionally, a neutral comonomer, with an inert hydrophobic solvent and an oil soluble surfactant, or surfactants. In the second step, the method provides for graft polymerization of the monomer or monomers onto the natural polymer by free radical polymerization in the presence of a thermal initiator and heat.

In a preferred embodiment, the aqueous discontinuous phase contains amounts of polysaccharide ranging from 5 to 95%, preferably from 20 to 50%, by weight of the final graft copolymer. The aqueous phase also contains amounts of monomer ranging from 95 to 5%, preferably from 80 to 50%, by weight of the final graft copolymer. The aqueous phase also contains amounts of nonionic comonomer ranging from 0-50% by weight of the total monomer present.

The continuous phase of the emulsion contains a hydrophobic solvent and an oil-soluble surfactant, or surfactants.

Solvents suitable for the practice of this invention are selected from a large group of organic liquids which include liquid hydrocarbons and substituted liquid hydrocarbons. The preferred group of organic liquids are hydrocarbon liquids, most preferably aliphatic hydrocarbon liquids, which include blends of aromatic and aliphatic hydrocarbon compounds which contain from 4 to 8 carbon atoms. Thus, such organic hydrocarbon liquids as benzene, xylene, toluene, mineral oils, kerosenes, naphthas, and in certain instances, petroleum oils may be used.

Any conventional water-in-oil surfactant can be used in forming the emulsion. The surfactant may be cationic, anionic or nonionic in nature, so long as it does not react with the polymer to form a nonequimolar charge ratio on the graft copolymer. Particularly suitable surfactants are the oil soluble polyhydroxyethylated nonionic surfactants, for example, hydroxyethylated nonyl phenols, hydroxyethylated long-chain mono-carboxylic acids and fatty acids, fatty acid esters of sorbitol and hydroxyethylated fatty acid esters of sorbitol. The surfactant is present in an amount of 1 to 30% by weight, preferably 2 to 15% by weight of the total emulsion.

Free radical yielding initiators useful herein in polymerization of ethylenically unsaturated monomers, include but are not limited to initiators such as benzoyl peroxide, lauroyl peroxide, potassium persulfate; and redox couples such as tertiary butyl hydroperoxide and sodium metabisulfite; and the like, advantageously in amounts ranging between 0.002 and 0.2% by weight of the oil or monomer phase, depending upon the solubility of the initiator. Other free radical initiators may also be used herein.

Elevated reaction temperatures, advantageously between 40° and 70° C., are used with free radical yielding initiators. Within such a temperature range, conversion is substantially complete in from one-half to several days, depending upon monomer and reaction variables.

The reaction is generally carried out at atmospheric or substantially atmospheric pressure. However, superatmospheric pressure is advantageously used when volatile ingredients are involved.

In practice, the water-in-oil emulsifying agent is dissolved in the oil phase, while the free radical initiator is dissolved in the oil or monomer phase, depending upon whether an oil or water-soluble initiator is used. The natural polymer and monomer or comoners, or an aqueous dispersion prepared by slurring the natural polymer in water with the water soluble monomer or comonomers is then added to the oil phase with agitation until the water phase is emulsified in the oil phase, and the reaction is carried out as indicated above. The order of addition of reaction media ingredients is not important. The reaction is continued with agitation until conversion is substantially complete. A polymeric latex emulsion is thereby obtained. The polymer is separated from the reaction medium advantageously by adding an organic solvent and filtering, and is then washed and dried. Alternatively, the latex reaction product can be used as such.

The resulting polyampholyte can be used as an additive, particularly in paper making, oil flood recovery and oil drilling, where the viscosity or water retention capacity of an electrolyte-containing brine must be enhanced. Polyampholytes prepared from natural polymers by the method of this invention can be used as a low cost alternative in any industrial process wherein a synthetic polyampholyte can be used as a stabilizer, water loss control agent or thickener.

A further advantage to the polyampholytes produced herein is the ability of these emulsions to be inverted in the presence of water so that the polymer rapidly goes into solution. As such, these polymer containing emulsions release the polymer in the water in a very short period of time when compared to the amount of time required to dissolve a comparable solid graft copolymer. This rapid inversion renders the emulsions especially suited for water retention and thickening applications.

This advantageous rapid inversion method of introducing chemical compositions into aqueous solutions or dispersions was taught in U.S. Pat. No. Re. 28,576 to Anderson, et al.

The novel guar gum graft copolymer claimed herein may be prepared by any method known in the art for grafting monomers onto natural polymers, such as free radical synthesis with chemical initiators, high energy radiation initiation or thermal initiation. The copolymerization may occur in solution, suspension, emulsion or in any medium which is known in the art, or which may become known in the art for graft copolymerization. The guar gum and the monomer or comonomers may be used in any proportion suitable for synthesis of a graft copolymer which is characterized by resistance to loss of intrinsic viscosity in the presence of electrolytes and dispersibility in water.

In a preferred embodiment, wherein the inverse emulsion method of this invention is used for the graft copolymerization of guar gum, the amount of guar gum may range from 5 to 95%, preferably from 20–50%, by weight of the final graft copolymer. Accordingly, the amount of the monomer or comonomer may range from 95 to 5%, preferably from 80 to 50%, by weight of the final graft copolymer.

The amount of nonionic reactive comonomer may range from 0 to 50% by weight of the total monomer in the final graft copolymer. Amounts used depend upon the particular monomers used and intended end-use of the graft copolymer.

Guar gum, or any neutrally-charged, water-dispersible derivative of guar gum, such as hydroxypropyl ether of guar gum, may be used as the starting polymer for grafting.

In a preferred embodiment, a hydroxypropyl ether of hydrolyzed guar gum is used. This derivative is much less viscous and therefore, more readily emulsified than guar gum. If underivatized guar gum is preferred for a particular end-use, the quantity of surfactant and organic solvent is increased to assist in the formation of an emulsion.

Suitable monomers are described in the discussion of the thickening and stabilizing agents of this invention, supra.

It will, of course, be recognized by those skilled in the art that the specific end use application will dictate the optimal composition of the graft copolymer. Thus, for example, while some compositions may provide superior thickening properties, other compositions, such as are readily determined by the practitioner, should be used in formulating graft copolymers to be used as retention aids.

In the following examples, which are merely illustrative of the various embodiments of the present invention, all parts are by weight and all temperatures in degrees Celsius unless otherwise indicated.

EXAMPLE 1

This example describes the solution preparation of a starch graft copolymer with VISB which is characterized by salt insensitivity similar to that of a VISB homopolymer or a VISB and acrylamide copolymer.

The VISB monomer was prepared according to the procedure disclosed by J. C. Salamone, et al., in *Polymer* 18; 1058 (1977). A VISB homopolymer and a VISB and acrylamide copolymer were prepared as controls for comparison with the polysaccharide graft copolymers of this invention.

The homopolymerization reaction of the VISB monomer was carried out under nitrogen at 60° C. for 24 hours. The behavior of this homopolymer in salt solutions was consistent with results reported by J. C. Salamone, et al., in *A.C.S. Symp. Ser,* 187:337 (1980) and in *Polymer,* 19:1157 (1978).

The copolymerization reaction of the VISB with acrylamide was carried out in solution. Acrylamide (5 g) and VISB (10) were dissolved in degassed water (40 g) in a 250 ml four-neck round-bottom flask, equipped with a mechanical stirrer, condenser, addition funnel and nitrogen gas inlet. The temperature of the mixture was raised to 65° C. An initiator, 4,4'-azo-bis(4-cyanovaleric acid), (60 mg in 3 ml water) was added in three portions, each one hour apart. The polymerization then continued for 3 hours. The polymerization was quenched with 5 drops of monomethyl ether hydroquinone solution (1% ethanol solution).

A starch graft copolymer with VISB was prepared using a derivatized starch. An acid-hydrolyzed waxy maize starch was treated with 1% allyl glycidyl ether to form the ether derivative. A total of 100 parts of acid-hydrolyzed waxy starch (85 WF) was slurried in an aqueous solution of 1.5 parts of sodium hydroxide and 25 parts sodium sulfate in 150 parts water, then 1.0 part allyl glycidyl ether was added to the starch slurry. The mixture was agitated at 40° C. for 16 hours and the pH was lowered to 5.5 by adding 9.3% aqueous hydrochloric acid. The starch derivative was recovered by filtration, washed three times with water and air dried.

A starch dispersion was prepared by cooking 18.75 g of this derivatized starch in 50 g water for 20 minutes. VISB (7.5 g) and 60 mg of 4,4'-azo-bis(4-cyanovaleric acid), a thermal initiator, were added to the cooked starch dispersion. The reaction was heated to 65° C., stirred for 24 hours and terminated by the addition of 5 drops of a 1% solution of monomethyl ether hydroquinone in ethanol.

The VISB homopolymer was insoluble in distilled water but soluble in 0.5N, 1.0N and 2.0N KCl solutions. The starch graft copolymer was soluble in distilled water and in 0.5N, 1.0N and 2.0N KCl solutions.

The intrinsic viscosities of the polymers in the KCl solutions were measured at 25° C. using a Cannon-Fenske viscometer. The results are shown in Table I.

The intrinsic viscosity of the starch graft copolymers, and the VISB polymers increased as the KCl concentration increased. The intrinsic viscosity of the starch control did not change as the KCl concentration increased from 0.5N to 2.0N.

EXAMPLE 2

This example illustrates that the addition of acrylamide to the graft copolymerization reaction of derivatized starch with VISB yields an electrolyte-tolerant product of higher viscosity than that of the starch graft copolymer with VISB alone.

The starch graft copolymer was prepared by the method of Example 1, above, except that acrylamide was added to the starch together with the VISB in a starch-to-VISB-to-acrylamide weight ratio of 4:2:1 prior to initiation of the reaction.

The intrinsic viscosity was measured as in Example 1, above. The results are shown in Table I.

TABLE I

Intrinsic Viscosity[a] in KCL Solutions

| Polymer | KCl Concentration | | |
|---|---|---|---|
| | 0.5N | 1.0N | 2.0N |
| VISB[b] Homopolymer | 0.13 | 0.27 | 0.37 |
| VISB[b]/Acrylamide Copolymer | 0.56 | 0.68 | 0.74 |
| Starch[c] Control | 0.18 | 0.18 | 0.18 |
| VISB[b]/Starch[c] Graft Copolymer | 0.13 | 0.17 | 0.19 |
| VISB[b]/Acrylamide Starch[c] Graft Copolymer | 0.56 | 0.61 | 0.63 |

[a] dl/g
[b] 1-vinyl-3(3-sulfopropyl)imidazolium inner salt.
[c] Allyl glycidyl ether (1% treatment) derivative of 85WF waxy maize starch The intrinsic viscosity of the starch graft copolymer prepared with acrylamide was higher than that of the copolymer without acrylamide in corresponding KCl solutions. The intrinsic viscosities of the starch graft copolymers with acrylamide were similar to those of the VISB/acrylamide copolymer.

EXAMPLE 3

This example describes the preparation of a VISB/acrylamide copolymer and a starch graft copolymer with VISB and acrylamide by the inverse (water-in-oil) emulsion method of this invention. Like the copolymers prepared in solution, these copolymers display electrolyte-tolerant intrinsic viscosities.

To prepare the VISB/acrylamide copolymer, a water-in-oil emulsion of VISB (10 g), acrylamide (5 g), Isopar M (a branched-chain isoparaffinic oil obtained from Exxon Corporation) (30 g), and Tween 85 (polyoxyethylene sorbitan trioleate) (3 g), was formed by adding each element to a 250 ml three-neck round-bottom flask and stirring the mixture with a mechanical stirrer. The reaction was carried out at 65°–70° C. under nitrogen gas. A thermal initiator, t-butyl peroxypivalate, was added in three portions (a total of 0.2 ml, diluted with 2 g of Isopar M was used), each one hour apart. After holding the reaction for an additional three hours, it was quenched with 5 drops of a 1% solution of monomethyl ether hydroquinone in ethanol.

The inverse emulsion starch graft copolymerization reaction was carried out by the method described above, for the VISB/acrylamide copolymer, except that 20 g of starch (acid-hydrolyzed waxy maize starch treated with 1% allyl glycidyl ether) was cooked in 60 g water for 20 minutes and added to the reaction vessel prior to the VISB and acrylamide additions. The starch-to-VISB-to-acrylamide ratio by weight was 4:2:1. A copolymer in a starch-to-VISB-to-acrylamide weight ratio of 4:1.5:1.5 was also prepared.

The intrinsic viscosities were measured as in Example 1, above. The results are shown in Table II.

TABLE II

| | Intrinsic Viscosity[a] in KCl Solutions | | |
|---|---|---|---|
| | | KCl Concentration | |
| Copolymer | 0.5N | 1.0N | 2.0N |
| VISB[b]/acrylamide copolymer: | | | |
| Solution Preparation | 0.56 | 0.68 | 0.74 |
| Inverse Emulsion Preparation | 2.11 | 2.32 | 2.96 |
| Starch[c] VISB[b]/Acrylamide graft copolymer (W:W:W = 4:2:1) | | | |
| Solution Preparation | 0.56 | 0.61 | 0.63 |
| Inverse Emulsion Preparation (W:W:W = 4:1.5:1.5) | 0.47 | 0.54 | 0.62 |
| Inverse Emulsion Preparation | 0.45 | 0.55 | 0.62 |

[a] dl/g
[b] 1-vinyl-3-(3-sulfopropyl)imidazolium inner salt.
[c] Allyl glycidyl ether (1% treatment) derivative of 85WF waxy maize starch Copolymerization in an inverse emulsion yielded starch graft copolymers that increased in intrinsic viscosity with increasing KCl concentrations. The viscosity behavior of the inverse emulsion prepared copolymer closely resembled that of the copolymers prepared in solution, however the inverse emulsion copolymers were easier to handle. In addition, a pronounced increase in intrinsic viscosity, initially and with increasing KCl concentration, was observed in the non-polysaccharide VISB/acrylamide copolymer that was copolymerized in an inverse emulsion.

EXAMPLE 4

This example illustrates that starch graft copolymers thicken water.

A copolymer with a starch-to-VISB-to-acrylamide weight ratio of 4:1.5:1.5 was prepared by the inverse emulsion method of Example 3. Samples of the copolymer were dispersed at 2% on a weight basis in distilled water, 0.5N KCl, 1.0N KCl and 2.0N KCl. The viscosities of these dispersions were measured with a Brookfield viscometer using a #21 spindle at 50 rpms and 23° C. Results are shown in Table III.

TABLE III

| Brookfield Viscosity in Water and KCl Solutions | |
|---|---|
| Dispersant (Containing 2% copolymer[a]) | Viscosity (cps) |
| Water | 20 |
| 0.5N KCl | 24 |
| 1.0N KCl | 25 |
| 2.0N KCl | 28 |

[a] Starch graft copolymer of VISB/Acrylamide (4:1.5:1.5) employing an allyl glycidyl ether (1% treatment) derivative of 85 WF waxy maize starch.

The copolymer is dispersible in water as well as in KCl solution. The results show that the copolymer thickens water, and that the viscosity of the dispersion increases slightly as the amount of KCl is increased from 0 to 2.0N.

EXAMPLE 5

This example illustrates that the starch graft copolymers display salt insensitivity in the presence of salts other than KCl.

The intrinsic viscosities of the VISB homopolymer and the starch graft copolymer with VISB, prepared by the method of Example 1, and the starch graft copolymer with VISB and acrylamide, prepared by the method of Example 3, were measured as in Example 1 in the presence of various salts. The viscosities were measured in 1.0N solutions of KI, KBr, KCl, NaCl, LiCl, CaCl$_2$ and MgCl$_2$. Results are shown in Table IV.

TABLE IV

| | Intrinsic Viscosity[a] in 1.0N Salt Solutions | | |
|---|---|---|---|
| Salt | VISB[b] Homopolymer | VISB[b]/Starch[c] Graft Copolymer[d] | VISB[b]/Acrylamide Starch[c] Graft Copolymer[e] |
| KI | 0.39 | 0.22 | 0.63 |
| KBr | 0.37 | 0.27 | 0.57 |
| KCl | 0.30 (0.17)[f] | 0.17 | 0.52 |
| NaCl | 0.29 | 0.17 | 0.48 |
| LiCl | 0.25 | 0.16 | 0.48 |
| CaCl$_2$ | (0.20)[f] | 0.19 | 0.59 |
| MgCl$_2$ | (0.24)[f] | 0.20 | 0.70 |

[a] dl/g
[b] 1-vinyl-3-(3-sulfopropyl)imidazolium inner salt
[c] Allyl glycidyl ether (1% treatment) derivative of 85 WF waxy maize starch
[d] copolymerized in solution
[e] copolymerized in inverse emulsion
[f] a different batch of VISB homopolymer was used The intrinsic viscosities of these copolymers varied with the nature of the anion and the cation, however, all copolymers displayed acceptable tolerance to each of the salts tested.

EXAMPLE 6

This example illustrates that an electrolyte-tolerant starch graft copolymer can be prepared from an underivatized starch base.

A waxy maize starch, acid-converted to 85 WF, was copolymerized with VISB and acrylamide by the method disclosed in Example 3. The intrinsic viscosity of this copolymer was evaluated in KCl solutions using the method disclosed in Example 1. Results are shown in Table V.

TABLE V

| | Intrinsic Viscosity[a] in KCl Solutions | | |
|---|---|---|---|
| | | KCl Concentration | |
| | 0.5N | 1.0N | 2.0N |
| Underivatized Starch[c] Graft Copolymer with VISB[b] and acrylamide | 0.37 | 0.43 | 0.47 |

[a] dl/g
[b] 1-vinyl-3-(3-sulfopropyl)imidazolium inner salt
[c] 85 WF waxy maize starch The intrinsic viscosity of the copolymer increased with increasing KCl concentration.

The intrinsic viscosities are only slightly lower than those obtained with an allyl glycidyl ether treated starch in corresponding salt solutions. Thus, an underivatized starch yields a graft copolymer that is acceptable for thickening salt solutions.

EXAMPLE 7

This example describes the preparation of a guar gum graft copolymer with VISB and acrylamide. This example also illustrates the behavior of this guar gum copolymer in KCl solutions.

The guar gum graft copolymer was prepared by the inverse emulsion method disclosed in Example 3, above, except that:

(a) the cooked starch dispersion was replaced by 20 g of hydroxypropylated guar gum which had been mixed with the monomers in 15 g water;
(b) the Isopar M was increased to 60 g;
(c) the Tween 85 was increased to 7.5 g;
(d) the t-Butyl peroxypivalate was replaced with ammonium persulfate (0.15 g in 5 ml of water) which was added dropwise over 2 hours; and
(e) the reaction was terminated by pouring the reaction mixture into 300 ml of ethanol, filtering, washing with ethanol and drying.

Prior to measuring intrinsic viscosity, the copolymer was dispersed in water, dialyzed and reprecipitated in ethanol. The resulting product had a nitrogen content of 1%. The intrinsic viscosities of the guar gum product were evaluated in 0.5N, 1.0N and 2.0N KCl solutions by the method disclosed in Example 1. Results are shown in Table VI.

The intrinsic viscosities of the guar gum graft copolymer increased with increasing KCl concentration.

TABLE VI

| Intrinsic Viscosity$^a$ in KCl Solutions | | | |
|---|---|---|---|
| | KCl Concentration | | |
| | 0.5N | 1.0N | 2.0N |
| Guar Gum$^b$ Graft Copolymer with VISB$^c$ and acrylamide | 8.30 | 9.22 | 10.00 |

$^a$dl/g
$^b$hydroxypropyl derivative of hydrolyzed guar gum
$^c$1-vinyl-3-(3-sulfopropyl)imidazolium inner salt

EXAMPLE 8

This example illustrates that the starch graft copolymer provides effective fluid loss control in calcium-containing systems, such as oil drilling muds used for the recovery of oil from subterraneum oil reservoirs.

The copolymer was tested for fluid loss using the standard procedure described in API Recommended Practice 13B, May 1982. The starch graft copolymer with VISB and acrylamide was prepared as in Example 3, in a starch-to-VISB-to-acrylamide weight ratio of 4:2:1. The copolymer was added in treatment levels of 1, 2 and 3 pounds per barrel (ppb) to drilling fluid prepared from Bentonite clay and a saturated aqueous solution of CaCl$_2$. The fluids were evaluated after aging overnight at 180° F. under 100 psi nitrogen pressure. The results are shown in Table VII.

The starch graft copolymer was effective at 2-3 ppb in controlling fluid loss in calcium-containing oil drilling muds.

TABLE VII

| | Fluid Loss in Drilling Muds |
|---|---|
| Treatment* Level(ppb) | API Fluid Loss Results After 180° F. Aging (cc after 30 minutes) in saturated CaCl$_2$ |
| 1 | 320 |
| 2 | 5.4 |
| 3 | 4.0 |

*Treated with starch graft copolymer with VISB and acrylamide, wherein the starch is an allyl glycidyl ether derivative of 85WF waxy maize.

EXAMPLE 9

This example illustrates the effectiveness of the starch graft copolymer as drainage aids useful in the manufacture of paper, wherein the pulp, or stock contains electrolytes.

The starch graft copolymer used in Example 8 and a commercially available amphoteric starch derivative (0.26% Nitrogen; 0.1% Phosphorus) were diluted with distilled water to concentrations of 0.1%. These samples were then added at 0.5%, by weight, based on dry pulp, to a high conductivity (9530 microohms/cm) "thick water" pulp stock sample (under typical commercial conditions, paper stock has about 3000 microohms/cm) having a pH of 8.1, which was obtained from a commercial paper manufacturer. The pulp (100 ml at 1% consistency) was initially mixed with the starch drainage aid for 1 min. Then, this mixture was diluted with 1500 ml of hard water (containing approximately 100 ppm CaCO$_3$), added to a modified Britt jar (Dynamics Drainage Jar) and mixed for 30 seconds. The plug was then pulled, the sample was allowed to drain to the 1500 ml mark, and the time required for 1200 ml to drain to the 300 ml mark was recorded. The drainage of a blank which contained no drainage aid was also determined. The results are shown in Table VIII.

A 28 percent improvement (calculated as percentage reduction in drain times) in drainage was obtained from the starch graft copolymer compared to the blank sample. The commercially used amphoteric starch derivative showed almost no improvement in drainage from the high conductivity stock compared to the blank sample.

Thus, the polysaccharide graft copolymers of this invention are useful as thickeners and stabilizers in industrial applications requiring performance in the presence of electrolytes.

TABLE VIII

| High Conductivity Paper Pulp Stock Drainage | |
|---|---|
| Sample | Time in seconds |
| Blank | 52 |
| Polycationic Starch Derivative (0.26% Nitrogen; 0.1% Phosphorus) | 50 |
| Starch Graft Copolymer* | 37 |

*Allyl glycidyl ether (1% treatment) derivative of 85 WF waxy maize starch copolymerized with VISB and acrylamide.

Now that the preferred embodiments of the present invention have been described in detail, various modifications and improvements thereon will become readily apparent to those skilled in the art. Accordingly the spirit and scope of the invention are to be limited only by the appended claims and not by the foregoing specification.

I claim:

1. A method for thickening, stabilizing or enhancing water retention in an aqueous media, comprising the steps:
   (a) Graft copolymerizing a polysaccharide with an ionic monomer(s) selected from the group consisting of a zwitterionic monomer and a cationic/anionic monomer pair in the presence of a thermal initiator(s) to yield a neutrally-charged, water-dispersible polyampholyte containing an equimolar ratio of cationic and anionic substitutents; and
   (b) Dispersing the polyampholyte in the aqueous media,
   wherein the dispersed polyampholyte is characterized by resistance to loss of intrinsic viscosity in the presence of electrolytes.

2. The method of claim 1, wherein the zwitterionic monomer is 1-vinyl-3-(3-sulphopropyl) imidazolium inner salt.

3. The method of claim 1, wherein the cationic/anionic monomer pair is 3-methacrylamidopropyltrimethylammonium ion/2-acrylamido-2-methyl-propane sulfonate ion.

4. The method of claim 1, wherein the polysaccharide is selected from the group comprising starch, cellulose, gum, modifications thereof and derivatives thereof.

5. The method of claim 1, wherein up to 50%, by weight, of the ionic monomer(s) is replaced with a nonionic comonomer(s) prior to graft copolymerization of the polysaccharide.

6. The method of claim 1, wherein the aqueous media is a stock used in the manufacture of paper.

7. The method of claim 1, wherein the aqueous media is a drilling mud used in the recovery of oil.

* * * * *